(12) United States Patent
Vollert

(10) Patent No.: US 7,951,337 B2
(45) Date of Patent: May 31, 2011

(54) MINIATURIZED MICROTITER PLATE FOR HT-SCREENING

(75) Inventor: Henning Vollert, Hofheim-Lorsbach (DE)

(73) Assignee: Sanopi-Aventis Deutschland GmbH, Frankfurt am Main (DE)

( * ) Notice: Subject to any disclaimer, the term of this patent is extended or adjusted under 35 U.S.C. 154(b) by 0 days.

(21) Appl. No.: 12/127,965

(22) Filed: May 28, 2008

(65) Prior Publication Data

US 2009/0104081 A1    Apr. 23, 2009

Related U.S. Application Data

(63) Continuation of application No. 11/121,536, filed on May 2, 2005, now abandoned, which is a continuation of application No. 09/646,986, filed as application No. PCT/EP99/01729 on Mar. 17, 1999, now abandoned.

(30) Foreign Application Priority Data

Mar. 27, 1998 (DE) .............................. 298 05 613 U
Aug. 12, 1998 (DE) ................................ 198 36 505
Oct. 1, 1998 (DE) .............................. 298 17 256 U

(51) Int. Cl.
*B01L 3/00* (2006.01)
(52) U.S. Cl. .... 422/102; 422/99; 435/288.3; 435/288.4; 436/164; 436/172
(58) Field of Classification Search .................. 422/58, 422/99, 102; 435/283.1, 287.8, 287.9, 288.3, 435/288.4; 436/164, 172, 174
See application file for complete search history.

(56) References Cited

U.S. PATENT DOCUMENTS

| | | |
|---|---|---|
| 5,084,246 A | 1/1992 | Lyman et al. |
| 5,380,493 A | 1/1995 | Chavez et al. |
| 5,457,527 A | 10/1995 | Manns et al. |
| 5,487,872 A | 1/1996 | Hafeman et al. |
| 5,587,321 A | 12/1996 | Smith et al. |
| 5,738,825 A | 4/1998 | Rudigier et al. |
| 5,817,509 A | 10/1998 | Stevens et al. |
| 5,989,854 A | 11/1999 | Cook |
| 6,027,695 A | 2/2000 | Oldenburg et al. |
| 6,063,338 A | 5/2000 | Pham et al. |
| 6,074,614 A | 6/2000 | Haferrman et al. |
| 6,171,780 B1 | 1/2001 | Pham et al. |
| 6,258,325 B1 | 7/2001 | Sanadi |
| 6,316,774 B1 | 11/2001 | Giebeler et al. |
| 6,340,589 B1 | 1/2002 | Turner et al. |
| 6,419,827 B1 | 7/2002 | Sandell et al. |
| 6,503,456 B1 | 1/2003 | Knebel |

FOREIGN PATENT DOCUMENTS

DE    197 12 484 A1    3/1997
(Continued)

OTHER PUBLICATIONS

Radleys, Specialist Micro Titer Plates & Accessories, 1997.

*Primary Examiner* — Jill Warden
*Assistant Examiner* — Dwayne K Handy

(57) ABSTRACT

The invention relates to a miniaturized microtiter plate which has a body made of plastic and a base made of glass, 1000 to 4000 vessels (wells) (3), and a cover (4) which prevents evaporation. The diameter of the vessels (wells) (d) is approximately 1.0 to 1.8 mm. The base of the microtiter plate (2) has a layer thickness ranging from 0.07 to 0.2 mm and the distance of the outermost vessels (wells) from the edge of the glass base ranges from 4 to 11 mm.

10 Claims, 2 Drawing Sheets

FOREIGN PATENT DOCUMENTS

Figure 1:
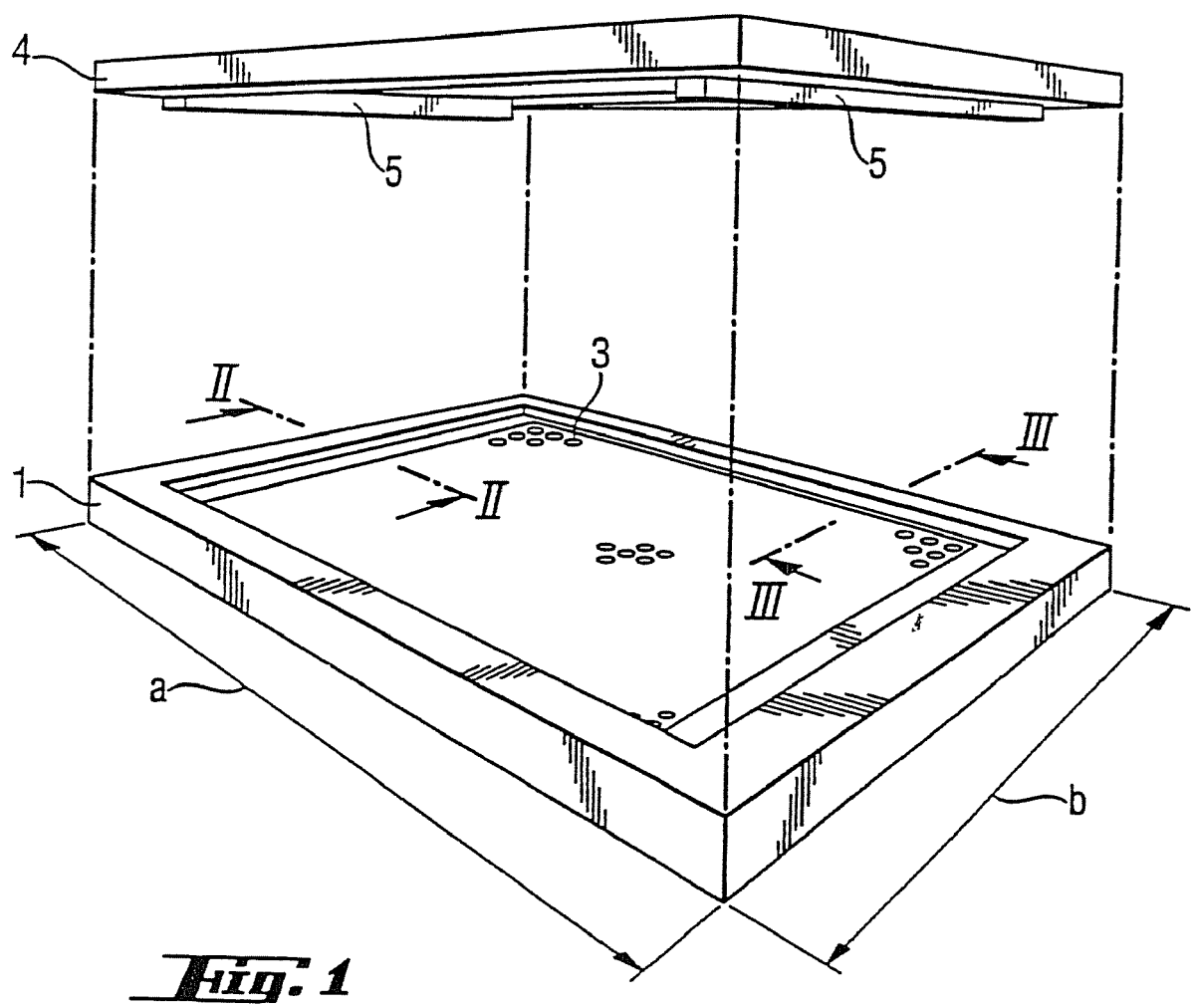

| | | |
|---|---|---|
| EP | 0 542 422 A1 | 10/1992 |
| EP | 0 571 661 A1 | 11/1992 |
| JP | 62-047533 | 3/1987 |
| JP | 09-218149 | 8/1987 |
| JP | 09-072843 | 3/1997 |
| JP | 10-78388 | 3/1998 |
| WO | WO 93/09872 | 5/1993 |
| WO | WO98/31466 | 7/1998 |

MINIATURIZED MICROTITER PLATE FOR HT-SCREENING

The invention relates to a miniaturized microtiter plate for HT screening (high throughput screening).

In this screening it is desirable to minimize the consumption of assay components and of the substances from the screening libraries and to maximize the throughput of screening assays. This can be achieved by miniaturizing screening assays. However, it is necessary in this case to charge appropriate microtiter plates having an assay volume of about 0.5 to 10 μl, preferably 1 to 6 μl, particularly preferably 1 to 2 μl. The only ones available to date are a few prototypes which can be processed only by particular analyzers. However, there is a need for microtiter plates which permit analysis with very sensitive detectors (with confocal optics) and allow charging with "nanodispensers". A further desirable feature is prevention of evaporation.

Microtiter plates have been disclosed by Greiner, 64943 Hirschberg, (Micro-Assay Plate, 1536 wells). In this case, the effective volume of the sample carriers is relatively large (4-8 μl) and they do not permit "single molecule detection". Although the effective volume of the Corning Costar microtiter plates (Corning Costar Deutschland, 55924 Bodenheim) is between 1 and 2 μl, the frame of the microtiter plates is too thin so that conventional robotic systems are unable to transport the microtiter plates. "Single molecule detection" is impossible in this case, too. A Hellma brochure (1994) "Silica Glass Microassay Plates" discloses microassay plates with a base made of silica glass and 384 wells with a diameter of 3.5 mm. However, besides the large assay volume, these microassay plates have frames which are insufficiently broad and bases which are too thick (>1 mm) to allow analysis using confocal optics. U.S. Pat. No. 5,487,872 describes multiassay microtiter plates for UV spectroscopy having glass plates with a minimum thickness of 0.38 mm. These microtiter plates are also unsuitable for analysis using confocal optics. Microassay plates with lids to prevent evaporation are described in a Radleys brochure (1997) "Specialist Micro Titer Plates & Accessories".

The object of the invention is to provide a remedy for this.

This takes place according to the invention by a miniaturized microtiter plate which has a body made of plastic and a base made of glass and has 1000 to 4000 vessels (wells), preferably 1400 to 2500 vessels (wells), particularly preferably 1536 vessels (wells), the diameter of the vessels (wells) is approximately 1.0 to 1.8 mm, preferably 1.2 to 1.5 mm, the base of the microtiter plate has a thickness of 0.07 to 0.2 mm, preferably 0.12 to 0.17 mm, particularly preferably 0.15 mm, the distance between the center of the outer vessels (wells) and the edge of the glass base is 4 to 11 mm, preferably ≧ (greater than/equal to) 5.5 mm and the microtiter plate has a lid to prevent evaporation.

The miniaturized microtiter plate usually has a size of 10.0-15.0×7.0-10.0 cm, preferably 12.7×8.5 cm. However, sizes differing from this are also possible.

The shape of the vessels (wells) is variable. Thus, for example, vessels which are round, have corners or have rounded corners can be used. Round vessels are preferred. It is likewise possible for the number of vessels (wells) to differ from the abovementioned values. The angle between base and wall of the wells can vary between 20° and 90°.

It is important to use the correct material to produce microtiter plates. The body of the microtiter plate consists of plastic such as, for example, polystyrene, polypropylene, polycarbonate, Vectra®, Hostalen®, Topas®. The microtiter plates are usually produced by injection molding (or embossing). The plastic cools after the injection molding. Warping of the microtiter plate is possible during this (because of local differences in the rate of cooling). It is thus beneficial to use a material which produces only a very slight "curvature".

The lid of the microtiter plate is likewise made of plastic and sits form-fittingly on the microtiter plate. The thickness of the base (material: glass) of the microtiter plate (0.07-0.20 mm) and the diameter of the vessels (about 1.0-1.8 mm), and the distance between the center of the outer vessels (wells) and the edge of the glass base, which is 4 to 11 mm, allow analysis of the microtiter plate using confocal optics. The use of confocal optics has the following advantages:

1. The sensitivity is very high (compared with non-confocal optics) since even individual molecules can be detected in some circumstances (single molecule detection)
2. Because the sensitivity is high, the measurement time can be less and thus the overall rate of analysis of a microtiter plate can be increased (compared with many non-confocal optics).
3. Since the focus of confocal optics is very small (usually distinctly less than 10 μm), detection of background signals is greatly reduced and thus the signal/noise ratio is better (compared with non-confocal optics).

The base, which consists of glass, of the microtiter plate can be coated with various chemical and biological substances, such as, for example, cellulose, cellulose derivatives, dextrans, polyethylene glycols, in order to suppress nonspecific binding. It ought likewise to be possible for the base to carry biological molecules which specifically bind other substances. The latter is important for use in drug screening, for example for sandwich assays.

Possible embodiments of the microtiter plate according to the invention are described in detail below with reference to FIGS. 1 to 3. The invention is, however, not restricted to these embodiments.

FIG. 1: Perspective depiction of the microtiter plate with lid lifted off

Figure 2:
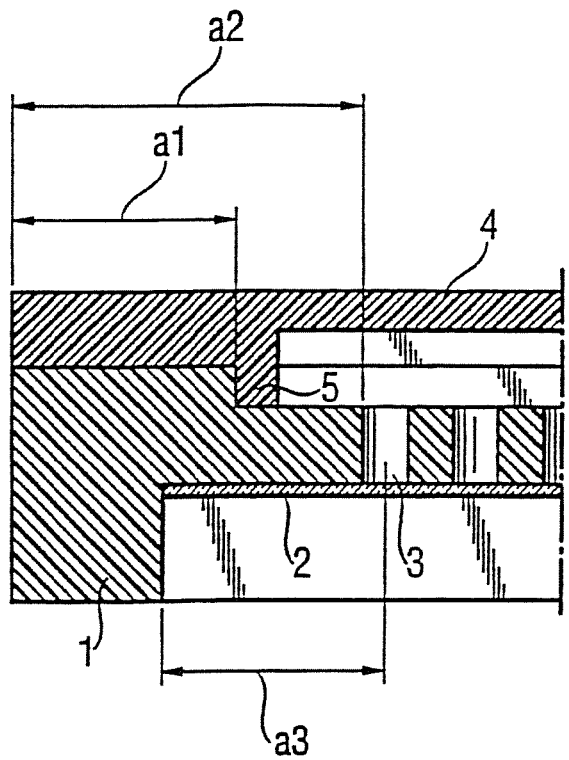

FIG. 2: Section along plane II-II from FIG. 1

Figure 3:
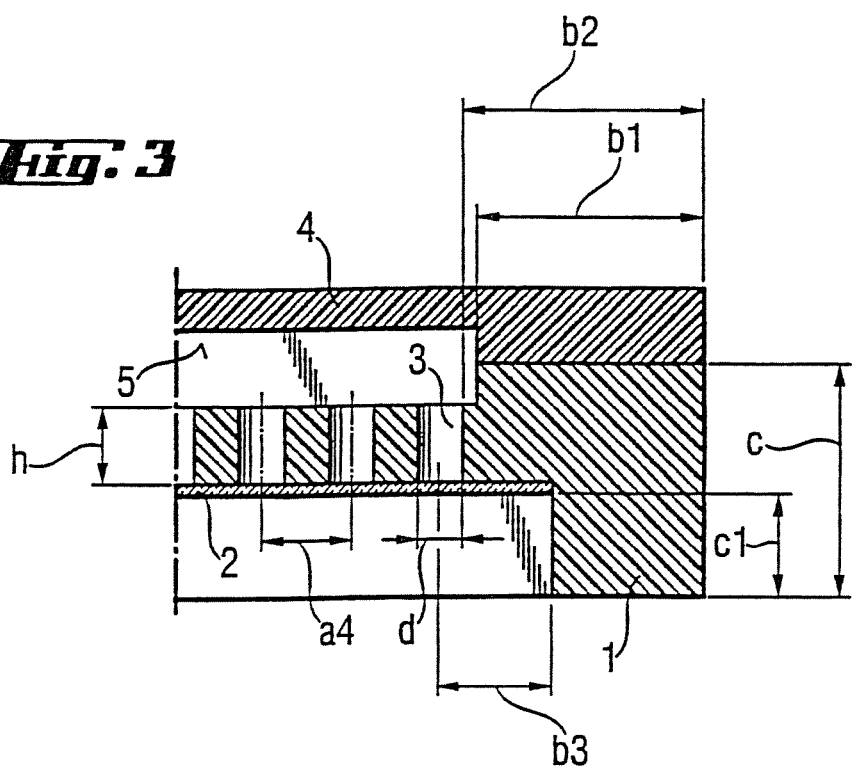

FIG. 3: Section along plane III-III from FIG. 1

FIG. 1 shows a perspective depiction of the microtiter plate with vessels (3). The frame (1) has a length of a=127 mm and a width of b=85 mm. The lid (4) with projections (5) is shown in the lifted-off state.

FIG. 2 depicts a section along plane II-II. The glass base (2) is fastened underneath the microtiter plate. The edge distance (a1) is 3-8 mm, preferably 6 mm, and the distance (a2) is 6-11 mm, preferably 9.5 mm. The corresponding edge distance (b1) in FIG. 3 is likewise 3-8 mm, preferably 6 mm, and the distance (b2) is 4-11 mm, preferably 6.5 mm. The distances between the center of the outer vessels (wells) and the edge of the glass base (a3, b3) are 4-11 mm. The height of the frame of the microtiter plate is c=6-20 mm, preferably 6-15 mm, particularly preferably 6 mm, and the inner height c1 is 3-12 mm, preferably 3 mm. The vessel diameter (d) is between 1.0 and 1.8 mm, particularly preferably 1.3 mm, the vessel distance (a4) is 2.25 mm and the vessel height (h) is between 2.0 and 7.0 mm.

The invention claimed is:

1. A miniaturized microtiter plate with vessels said plate having:
   a frame with a length of 127 mm, a width of 85 mm and a height c about 6-20 mm;
   a lid with projections;
   a glass base fastened to an underside of said frame;
   an edge distance a from said lid outer edge width to said projection about 3-8 mm;

an edge distance b from said lid outer edge width to a periphery of a vessel proximal to said outer edge about 6-11 mm;
an edge distance a' from said lid outer edge length to said projection about 3-8 mm;
an edge distance b' from said lid outer edge length to a periphery of a vessel proximal to said outer edge about 4-11 mm;
a distance between the center of a vessel proximal to said outer edge and an edge of said glass base about 4-11 mm;
a frame height c1 from the bottom of the frame to the glass base about 3-12 mm;
said vessels having a diameter between about 1.0 and 1.8 mm;
a distance between vessel centers about 2.25 mm; and
a vessel height between 2.0 and 7.0 mm,
whereby the microtiter plate has a body made of said frame, said base and said lid.

2. The miniaturized microtiter plate of claim 1 wherein the edge distance a is about 6 mm.

3. The miniaturized microtiter plate of claim 1 wherein the edge distance b is about 9.5 mm.

4. The miniaturized microtiter plate of claim 1 wherein the edge distance a' is about 6 mm.

5. The miniaturized microtiter plate of claim 1 wherein the edge distance b' is about 6.5 mm.

6. The miniaturized microtiter plate of claim 1 wherein said height is about 6-15 mm.

7. The miniaturized microtiter plate of claim 6 wherein said height is about 6 mm.

8. The miniaturized microtiter plate of claim 1 wherein said frame height from the bottom of the frame to the glass base about 3 mm.

9. The miniaturized microtiter plate of claim 1 wherein said diameter is about 1.3 mm.

10. A method for high throughput screening using confocal optics comprising:
providing a sample in a miniaturized microtiter plate with vessels said plate having:
a frame with a length of 127 mm, a width of 85 mm and a height c about 6-20 mm;
a lid with projections;
a glass base fastened to an underside of said frame;
an edge distance a from said lid outer edge width to said projection about 3-8 mm;
an edge distance b from said lid outer edge width to a periphery of a vessel proximal to said outer edge about 6-11 mm;
an edge distance a' from said lid outer edge length to said projection about 3-8 mm;
an edge distance b' from said lid outer edge length to a periphery of a vessel proximal to said outer edge about 4-11 mm;
a distance between the center of a vessel proximal to said outer edge and an edge of said glass base about 4-11 mm;
a frame height c1 from the bottom of the frame to the glass base about 3-12 mm;
said vessels having a diameter between about 1.0 and 1.8 mm;
a distance between vessel centers about 2.25 mm; and
a vessel height between 2.0 and 7.0 mm,
whereby the microtiter plate has a body made of said frame, said base and said lid positioning said plate for analysis by a confocal optics device; and analyzing said sample using the confocal optics device.

* * * * *

UNITED STATES PATENT AND TRADEMARK OFFICE
CERTIFICATE OF CORRECTION

| | | |
|---|---|---|
| PATENT NO. | : 7,951,337 B2 | Page 1 of 1 |
| APPLICATION NO. | : 12/127965 | |
| DATED | : May 31, 2011 | |
| INVENTOR(S) | : Vollert | |

It is certified that error appears in the above-identified patent and that said Letters Patent is hereby corrected as shown below:

On the Title page, in Item (73), in column 1, in "Assignee", line 1, delete "Sanopi" and insert -- Sanofi --, therefor.

Signed and Sealed this
Sixth Day of December, 2011

David J. Kappos
*Director of the United States Patent and Trademark Office*